UNITED STATES PATENT OFFICE.

CARL DUISBERG, OF ELBERFELD, GERMANY.

BLUE COLORING-MATTER FROM NITROPHENETOL.

SPECIFICATION forming part of Letters Patent No. 342,432, dated May 25, 1886.

Application filed December 14, 1885. Serial No. 185,642. (Specimens.)

*To all whom it may concern:*

Be it known that I, CARL DUISBERG, of Elberfeld, in the Empire of Germany, chemist, and assignor to the FARBENFABRIKEN VORM. FRIEDR. BAYER & CO., have invented a new and useful Improvement in the Manufacture of Dye-Stuffs or Coloring-Matter, of which the following is a specification.

My invention relates to the production of a new blue-red coloring-matter for dyeing cotton, wool, and silk by the action of tetrazodiphenoldiaethylester upon the beta-naphthylaminmonosulpho acid gained by heating beta-naphtholmonosulpho acid with ammonia or sulphonizing beta-naphthylamine with concentrated or fuming sulphuric acid.

In carrying out my process I proceed as follows: 10 (ten) kilos of diamidodiphenoldiaethylester (diphenetidin) produced by the alkaline reduction of nitrophenolaethylester (nitrophenetol) and transforming the formed hydrazodiphenoldiaethylester by means of concentrated acids, are dissolved in one hundred and fifty liters water and 20 (twenty) kilos of muriatic acid of the specific gravity of 1,161. When this solution is cooled by ice, 6 (six) kilos sodium nitrite dissolved in water are gradually added. In this way a reddish-yellow solution of tetrazodiphenoldiaethylester is formed. This solution is now added to 18 (eighteen) kilos beta-naphthylaminmonosulpho acid, which is in a finely-comminuted condition in water, and so much acetate of soda or another organic acid salt added until all free mineral acid present has been replaced by acetic acid. The dark-brown precipitate formed is now allowed to stand for about twelve hours, then heated, transformed by treatment with soda or soda lye into the soda salt, filtered, and dried. In this way the soda salt of the following composition is formed:

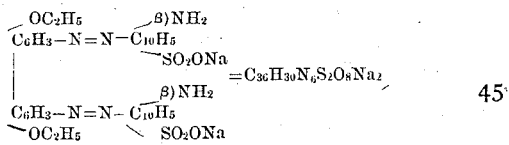

This substance, a homologue of the product gained by the action of tetrazodiphenoldimethylester on beta-naphthylaminmonosulpho acid shows the same properties as this body and differs only by the composition of two $(CH_2)$.

What I claim as my invention, and desire to secure by Letters Patent, is—

1. The process of producing the new coloring-matter herein described, which consists in azotizing the diamidodiphenoldiaethylester (ether) (diphenetidin) obtained from nitrophenolaethylester (ether) (nitrophenetol) by alkaline reduction, and the transformation of the formed hydrazodiphenoldiaethylester (ether) by means of acids with sodium nitrite forming the tetrazodiphenoldiaethylester (ether) and heating it in an organic acid solution with beta-naphthylaminmonosulpho acid.

2. The coloring-matter herein described, which is produced by the action of tetrazodiphenoldiaethylester (ether) upon the beta-naphthylaminmonosulpho acid by the process herein described, or any process which will produce a like result, substantially as described.

CARL DUISBERG.

Witnesses:
ANTHONY GREEF,
WILLIAM A. POLLOCK.